US012533883B2

(12) United States Patent
Kim et al.

(10) Patent No.: US 12,533,883 B2
(45) Date of Patent: Jan. 27, 2026

(54) INKJET PRINTER HEAD AND INKJET PRINTER INCLUDING INKJET PRINTER HEAD

(71) Applicant: Samsung Display Co., Ltd., Yongin-si (KR)

(72) Inventors: Jaesik Kim, Yongin-si (KR); Woo Yong Sung, Yongin-si (KR); Seungyong Song, Yongin-si (KR); Seungho Yoon, Yongin-si (KR); Hyoung Sub Lee, Yongin-si (KR); Hyemin Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 209 days.

(21) Appl. No.: 18/405,333

(22) Filed: Jan. 5, 2024

(65) Prior Publication Data

US 2024/0286407 A1 Aug. 29, 2024

(30) Foreign Application Priority Data

Feb. 27, 2023 (KR) ........................ 10-2023-0025659

(51) Int. Cl.
*B41J 2/14* (2006.01)
*B41J 29/02* (2006.01)

(52) U.S. Cl.
CPC ......... *B41J 2/1433* (2013.01); *B41J 2/14201* (2013.01); *B41J 29/02* (2013.01)

(58) Field of Classification Search
CPC ....... B41J 2/1433; B41J 2/14201; B41J 29/02
See application file for complete search history.

(56) References Cited

U.S. PATENT DOCUMENTS

| | | | | |
|---|---|---|---|---|
| 7,329,363 B2 * | 2/2008 | Lim | ........................ | B41J 2/1628 216/27 |
| 8,801,146 B2 | 8/2014 | Sung et al. | | |
| 2005/0068367 A1 * | 3/2005 | Kato | ...................... | B41J 2/1628 347/45 |
| 2010/0141709 A1 * | 6/2010 | DeBrabander | ......... | B41J 2/1623 29/890.1 |

FOREIGN PATENT DOCUMENTS

| | | |
|---|---|---|
| KR | 10-2008-0013626 | 2/2008 |
| KR | 10-2016579 | 9/2019 |

* cited by examiner

*Primary Examiner* — Jason S Uhlenhake
(74) *Attorney, Agent, or Firm* — CANTOR COLBURN LLP

(57) ABSTRACT

An inkjet printer includes a stage part and an inkjet printer head disposed on the stage part and including a plurality of head parts. Each of the head parts includes a chamber plate part including a chamber part, a nozzle plate part including a nozzle part, an outer side surface, an inner side surface, and a nozzle surface, an inorganic layer disposed on the outer side surface, a first metal oxide layer including a first portion, a second portion, and a third portion, a second metal oxide layer including a first metal portion and a second metal portion, a first self-assembled layer disposed on the first metal portion and having a first contact angle, and a second self-assembled layer disposed on the third portion and having a second contact angle smaller than the first contact angle.

20 Claims, 9 Drawing Sheets

INKJET PRINTER HEAD AND INKJET PRINTER INCLUDING INKJET PRINTER HEAD

CROSS REFERENCE TO RELATED APPLICATION(S)

This application claims priority to and benefits of Korean Patent Application No. 10-2023-0025659 under 35 U.S.C. § 119, filed on Feb. 27, 2023, in the Korean Intellectual Property Office, the entire contents of which are incorporated herein by reference.

BACKGROUND

1. Technical Field

The disclosure relates to an inkjet printer in which self-assembled layers different from each other are respectively disposed on outer and inner side surfaces.

2. Description of the Related Art

With the development of multimedia products, a display device is increasing in importance. Various display devices, such as an organic light emitting display, a liquid crystal display, etc., are being used.

The display device includes a display panel, such as an organic light emitting display panel or a liquid crystal display panel, as its display device displaying an image. The display panel includes a light emitting element, e.g., a light emitting diode, and an organic light emitting diode (OLED) using an organic material as its light emitting material or an inorganic light emitting diode using an inorganic material as its light emitting material is being used as the light emitting element. An inkjet printer is used to form an organic material layer or to align an inorganic light emitting diode in the display device. After an ink or solution is printed by an inkjet process, a post-processing process is carried out to transfer the inorganic light emitting diode or to form the organic material layer. The inkjet printer supplies an ink or solution to an inkjet printer head, and the inkjet printer head sprays the ink or solution onto a substrate to be processed, i.e., a target substrate.

SUMMARY

The disclosure provides an inkjet printer head with excellent ink ejection efficiency and superior abrasion resistance.

The disclosure provides an inkjet printer with excellent durability.

According to an embodiment, an inkjet printer may include a stage part and an inkjet printer head disposed on the stage part and including a plurality of head parts. Each of the plurality of head parts may include a chamber plate part including a chamber part, a nozzle plate part disposed between the chamber plate part and the stage part and including a nozzle part connected to the chamber part, an outer side surface adjacent to the stage part, an inner side surface adjacent to the chamber part, and a nozzle surface disposed between the outer side surface and the inner side surface and adjacent to the nozzle part, an inorganic layer disposed on the outer side surface, a first metal oxide layer including a first portion disposed on the inorganic layer, a second portion disposed on the nozzle surface, and a third portion disposed on the inner side surface, a second metal oxide layer including a first metal portion disposed on the first portion and a second metal portion disposed on the second portion, a first self-assembled layer disposed on the first metal portion and having a first contact angle, and a second self-assembled layer disposed on the third portion and having a second contact angle smaller than the first contact angle.

The second self-assembled layer may be disposed on and cover the second metal portion.

The first self-assembled layer may be disposed on and cover the second metal portion.

The inner side surface may include a flat surface disposed adjacent to the chamber part and facing the outer side surface and an inclination surface disposed between the flat surface and the nozzle surface and inclined in a direction from the flat surface to the nozzle surface.

The chamber plate part may further include a filter part disposed in the chamber part and comprising a plurality of openings, a metal plate disposed between the filter part and the nozzle plate part, a third self-assembled layer disposed to cover the filter part and having a third contact angle smaller than the first contact angle, a third metal oxide layer disposed between the third self-assembled layer and the filter part, a fourth self-assembled layer disposed to cover the metal plate and having a fourth contact angle smaller than the first contact angle, and a fourth metal oxide layer disposed between the fourth self-assembled layer and the metal plate.

Each of the filter part and the metal plate may include a stainless-steel.

The nozzle plate part may further include a piezoelectric element part disposed between the third portion and the inner side surface.

The inkjet printer may further include an organic layer disposed between the inorganic layer and the first portion, between the nozzle surface and the second portion, and between the inner side surface and the third portion. The organic layer may have a single-layer structure.

The inkjet printer may further include an adhesive auxiliary layer disposed between the organic layer and the first metal oxide layer.

The first self-assembled layer may include a first compound including a first hydrocarbon part, a first head part attached to an end of the first hydrocarbon part, and a first end part attached to another end of the first hydrocarbon part, the second self-assembled layer may include a second compound including a second hydrocarbon part, a second head part connected to an end of the second hydrocarbon part, and a second end part connected to another end of the second hydrocarbon part, the first head part may be disposed adjacent to the first metal oxide layer, and the second head part may be disposed adjacent to the second metal oxide layer.

The first head part may include one of a compound represented by Moieties 1:

[Moieties 1]

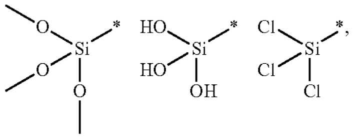

the first end part may include one of a compound represented by Moieties 2:

[Moieties 2]

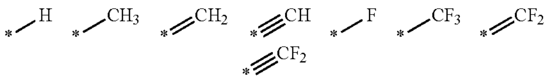

and the first hydrocarbon part may be an alkyl group of eight or more and sixty or less carbon atoms.

The second head part may include one of a compound represented by Moieties 1:

[Moieties 1[

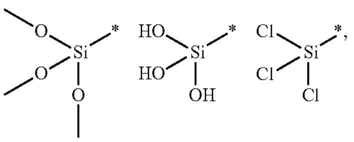

the second end part may include one of a compound represented by Moieties 2:

[Moieties 2]

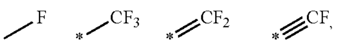

and the second hydrocarbon part may be an alkyl group of two or more and fifty or less carbon atoms.

The first contact angle may be in a range of about 10° to about 200°, and the second contact angle may be in a range of about 10° to about 130°.

According to an embodiment, an inkjet printer head may include at least one head part. The at least one head part may include a chamber plate part including a chamber part, a nozzle plate part including a nozzle part connected to the chamber part, an inner side surface adjacent to the chamber part, an outer side surface facing the inner side surface, and a nozzle surface disposed adjacent to the nozzle part and disposed between the outer side surface and the inner side surface, an inorganic layer disposed on the outer side surface, a first metal oxide layer including a first portion disposed on the inorganic layer, a second portion disposed on the nozzle surface, and a third portion disposed on the inner side surface, a second metal oxide layer including a first metal portion disposed on the first portion and a second metal portion disposed on the second portion, a first self-assembled layer disposed on the first metal portion and having a first contact angle, and a second self-assembled layer disposed on the third portion and having a second contact angle smaller than the first contact angle. The second metal portion may be covered by the first self-assembled layer or the second self-assembled layer.

The inner side surface may include a flat surface disposed adjacent to the chamber part and facing the outer side surface and an inclination surface disposed between the inner side surface and the outer side surface and inclined in a direction from the inner side surface to the outer side surface.

The first self-assembled layer may include a first compound including a first hydrocarbon part, a first head part attached to an end of the first hydrocarbon part, and a first end part attached to another end of the first hydrocarbon part, the second self-assembled layer may include a second compound including a second hydrocarbon part, a second head part connected to an end of the second hydrocarbon part, and a second end part connected to another end of the second hydrocarbon part, the first head part may be disposed adjacent to the first metal oxide layer, and the second head part may be disposed adjacent to the second metal oxide layer.

Each of the first and second head parts may include one of a compound represented by Moieties 1:

[Moieties 1]

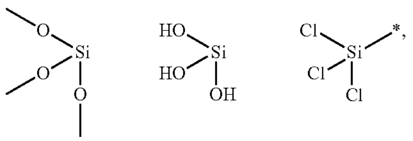

the first end part may include one of a compound represented by Moieties 2:

[Moieties 2]

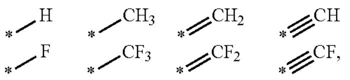

the second end part may include one of a compound represented by Moieties 3:

[Moieties 3]

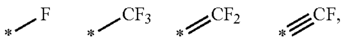

the first hydrocarbon part may be an alkyl group of eight or more and sixty or less carbon atoms, and the second hydrocarbon part may be an alkyl group of two or more and fifty or less carbon atoms.

The first contact angle may be in a range of about 100 to about 200°, and the second contact angle may be in a range of about 10° to about 130°.

The nozzle plate part may further include an organic piezoelectric element part including a piezoelectric element part disposed between the inner side surface and the third portion and an organic layer disposed between the piezoelectric element part and the first metal oxide layer and covering the piezoelectric element part, and a piezoelectric organic layer disposed between the inorganic layer and the first portion, between the nozzle surface and the second portion, and between the inner side surface and the third portion and cover the organic piezoelectric element part. The piezoelectric organic layer may be disposed directly on the organic layer.

The inkjet printer head may further include an adhesive auxiliary layer disposed between the organic layer and the piezoelectric organic layer.

According to the above, since the inkjet printer head includes the second self-assembled layer having a relatively small contact angle and disposed on the inner side surface of the head part and the first self-assembled layer having a relatively large contact angle and disposed on the outer side surface of the head part, the inkjet printer head has excellent ejection efficiency and superior abrasion resistance.

According to the above, as the inkjet printer includes the inkjet printer head provided with excellent ejection efficiency and superior abrasion resistance, the inkjet printer has excellent durability.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1A:
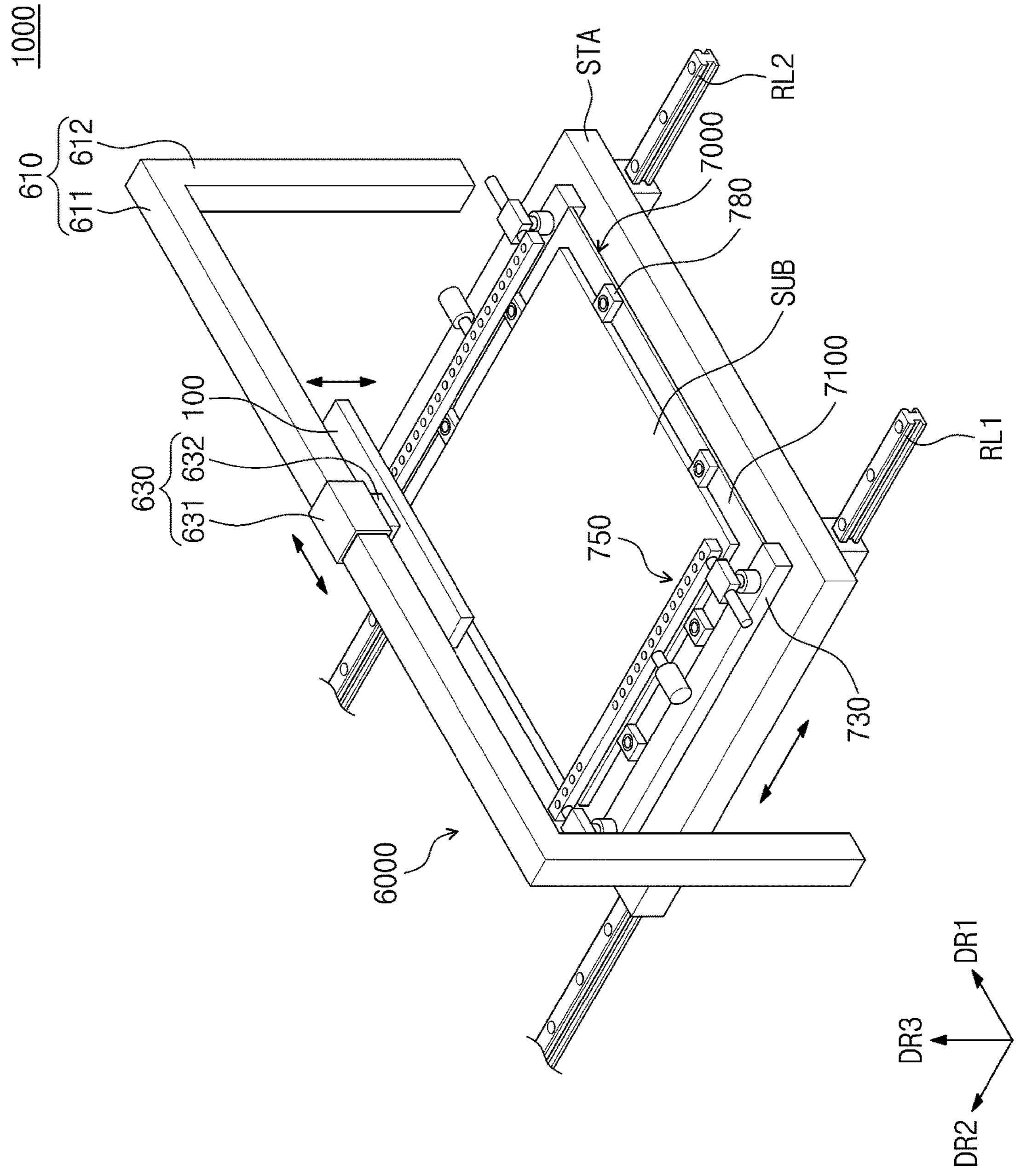
FIG. 1A is a perspective view of an inkjet printer according to an embodiment of the disclosure.

The disclosure may be variously modified and realized in many different forms, and thus specific embodiments will be illustrated in the drawings and described in detail hereinbelow. However, the disclosure should not be limited to the specific disclosed forms, and be construed to include all modifications, equivalents, or replacements included in the spirit and scope of the disclosure.

Like numerals refer to like elements throughout. In the drawings, the thickness, ratio, and dimension of components are exaggerated for effective description of the technical content. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure. As used herein, the singular forms, "a", "an" and "the" are intended to include the plural forms as well, unless the context clearly indicates otherwise.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element.

The terms "film" and "thin film" are used herein for simplicity. "Film" and "thin film" are meant to mean any continuous or non-continuous structures and material deposited by the methods disclosed herein. For example, "film" and "thin film" could include 2D materials, nanorods, nanotubes or nanoparticles or even single partial or full molecular layers or partial or full atomic layers or clusters of atoms and/or molecules. "Film" and "thin film" may comprise material or layer with pinholes, but still be at least partially continuous.

In the disclosure, an alkyl group may be linear or have a branched chain or a cycle shape. The number of carbon atoms in an alkyl group may be 1 or more to 60 or less, 1 or more to 30 or less, 1 or more to 20 or less, 1 or more, to 10 or less, or 1 or more to 6 or less. Examples of the alkyl group may include methyl, ethyl, n-propyl, isopropyl, n-butyl, s-butyl, t-butyl, i-butyl, 2-ethylbutyl, 3,3-dimethylbutyl, n-pentyl, i-pentyl, neopentyl, t-pentyl, cyclopentyl, 1-methylpentyl, 3-methylpentyl, 2-ethylpentyl, 4-methyl-2-pentyl, n-hexyl, 1-methylhexyl, 2-ethylhexyl, 2-butylhexyl, cyclohexyl, 4-methylcyclohexyl, 4-t-butylcyclohexyl, n-heptyl, 1-methylheptyl, 2,2-dimethylheptyl, 2-ethylheptyl, 2-butylheptyl, n-octyl, t-octyl, 2-ethyloctyl, 2-butyloctyl, 2-hexyloctyl, 3,7-dimethyloctyl, cyclooctyl, n-nonyl, n-decyl, adamantyl, 2-ethyldecyl, 2-butyldecyl, 2-hexyldecyl, 2-octyldecyl, n-undecyl, n-dodecyl, 2-ethyldodecyl, 2-butyldodecyl, 2-hexyldodecyl, 2-octyldodecyl, n-tridecyl, n-tetradecyl, n-pentadecyl, n-hexadecyl, 2-ethylhexadecyl, 2-butylhexadecyl, 2-hexylhexadecyl, 2-octylhexadecyl, n-heptadecyl, n-octadecyl, n-nonadecyl, n-eicosyl, 2-ethyl eicosyl, 2-butyl eicosyl, 2-hexyl eicosyl, 2-octyl eicosyl, n-henicosyl, n-docosyl, n-tricosyl, n-tetracosyl, n-pentacosyl, n-hexacosyl, n-heptacosyl, n-octacosyl, n-nonacosyl, n-triacontyl, etc., without limitation.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, an inkjet printer head and an inkjet printer according to embodiments of the disclosure will be described with reference to accompanying drawings.

Figure 1B:
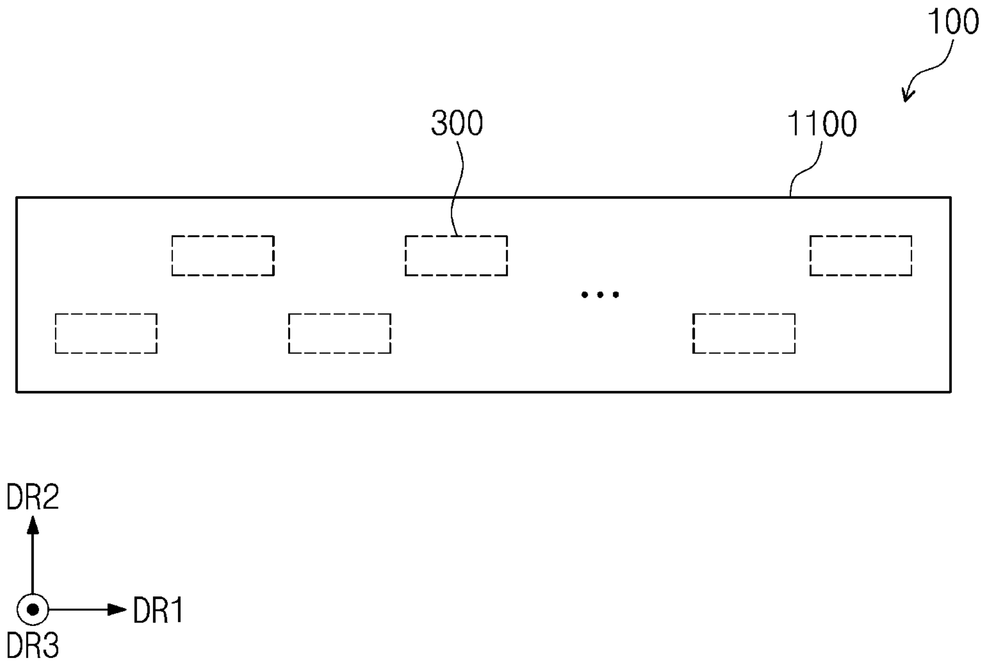
FIG. 1B is a plan view of an inkjet printer head according to an embodiment of the disclosure.

FIG. 1A is a perspective view of an inkjet printer 1000 according to an embodiment of the disclosure, and FIG. 1B is a plan view of an inkjet printer head 100 according to an embodiment of the disclosure. Referring to FIGS. 1A and 1B, the inkjet printer 1000 may include a inkjet printer head 100 and a probe device 7000. The inkjet printer 1000 may further include a stage part STA, a first moving unit including first and second rails RL1 and RL2 used to move the stage part STA, and a base frame 6000. The inkjet printer 1000 may spray an ink onto a target substrate SUB and may align particles dispersed in the ink, for example, bipolar elements, on the target substrate SUB. For example, the particles dispersed in the ink may be sprayed onto the target substrate SUB through the inkjet printer head 100. An electric field may be formed on the target substrate SUB, which is provided with the ink sprayed thereon, by the probe device 7000, and the particles included in the ink may be aligned on the target substrate SUB. The ink supplied to the inkjet printer head 100 may not flow in the inkjet printer head 100 while a printing process is not being performed, and the particles dispersed in the ink may be precipitated in the inkjet printer head 100.

In the drawing illustrating the inkjet printer 1000, a first direction DR1, a second direction DR2, and a third direction DR3 are shown. The first direction DR1 and the second direction DR2 may be perpendicular to each other on a plane. The third direction DR3 may be perpendicular to the plane substantially parallel to the first direction DR1 and the second direction DR2. Hereinafter, in embodiments illustrating the inkjet printer 1000, unless otherwise specified, the expression "upper portion" refers to a side in the third direction DR3, and the expression "upper surface" refers to a surface facing the side in the third direction DR3. The expression "lower portion" refers to another side in the third direction DR3, and the expression "lower surface" refers to a surface facing the another side in the third direction DR3. The expression "left", "right", "upper", and "lower" refer to directions in a plane when looking at the inkjet printer 1000 from above. For example, the expression "right side" refers to a side in the first direction DR1, the expression "left side" refers to another side of the first direction DR1, the expression "upper side" refers to a side in the second direction DR2, and the expression "lower side" refers to another side of the second direction DR2.

The target substrate SUB may be provided on the probe device 7000, the probe device 7000 may form the electric field on an upper portion of the target substrate SUB, and the particles included in the ink may be aligned by the electric field to align ends of particles to face in a direction.

A sub-stage 7100 may provide a space in which the target substrate SUB is disposed. A probe supporter 730, a probe unit 750, and an aligner 780 may be disposed on the sub-stage 7100. An overall shape of the sub-stage 7100 in a plan view may correspond to a shape of the target substrate SUB in a plan view. For example, in case that the target substrate SUB has a rectangular shape in a plan view, the overall shape of the sub-stage 7100 may be the rectangular shape in a plan view.

At least one aligner 780 may be disposed on the sub-stage 7100. In an embodiment, the aligner 780 may be disposed at each side of the sub-stage 7100, and multiple aligners 780 may surround an area in which the target substrate SUB is disposed.

The probe supporter 730 and the probe unit 750 may be disposed on the sub-stage 7100. The probe supporter 730 may provide a space in which the probe unit 750 is disposed on the sub-stage 7100.

The probe unit 750 may be disposed on the probe supporter 730 and may form the electric field on the target substrate SUB prepared on the sub-stage 7100.

The stage part STA may provide an area in which the probe device 7000 is disposed. The first moving unit may adjust a relative position between the stage part STA and the inkjet printer head 100. The first moving unit may include the first and second rails RL1 and RL2.

The stage part STA may be disposed on the first and second rails RL1 and RL2 extending in the second direction DR2. The stage part STA may be disposed on the first and second rails RL1 and RL2 and may linearly move in the second direction DR2, and thus, the printing process may be performed over an entire area of the target substrate SUB.

The target substrate SUB described herein may be a target object of the inkjet printer 1000 according to an embodiment and may be applied to various display devices, such as an inorganic light emitting display device including an inorganic light emitting diode containing an inorganic semiconductor, an organic light emitting display device including an organic light emitting diode containing an organic light emitting layer, a micro light emitting diode display device including a micro light emitting diode (micro-LED), or a quantum dot light emitting display device including a quantum dot light emitting diode containing a quantum dot light emitting layer.

The inkjet printer head 100 may spray the ink on the target substrate SUB. The inkjet printer head 100 may spray the ink onto the target substrate SUB during the inkjet printer 1000 is driven. The inkjet printer head 100 may spray the ink provided from an ink supplier to the target substrate SUB provided on the sub-stage 7100.

The ink sprayed from the inkjet printer head 100 may be in a solution state or a colloidal state. The ink may include a solvent and multiple particles dispersed in the solvent. For example, the solvent may include acetone, water, alcohol, toluene, propylene glycol (PG), propylene glycol methyl acetate (PGMA), triethylene glycol monobutyl ether (TGBE), diethylene glycol monophenyl ether (DGPE), an amide-based solvent, a dicarbonyl-based solvent, a diethylene glycol dibenzoate, tricarbonyl solvent, triethyl citrate, a phthalate-based solvent, benzyl butylphthalate, bis 2-ethlyhexyl phthalate, bis 2-ethylhexyl isophthalate, ethyl phthalyl ethyl glycolate, or the like, however, the disclosure should not be limited thereto or thereby.

The particles may be dispersed in the solvent, may be provided to the inkjet printer head 100 through the ink supplier, and may be sprayed through the inkjet printer head 100. The particles included in the ink may be an inorganic light emitting diode. The inorganic light emitting diode may include multiple semiconductor layers. For example, the inorganic light emitting diode may include a first conductive type (e.g., n-type) semiconductor layer, a second conductive type (e.g., p-type) semiconductor layer, and an active semiconductor layer interposed between the first conductive type semiconductor layer and the second conductive type semiconductor layer. The active semiconductor layer may receive holes and electrons respectively from the first conductive type semiconductor layer and the second conductive type semiconductor layer, and the holes may be combined with the electrons in the active semiconductor layer to emit a light.

The particles included in the ink may be an inorganic light emitting diode, however, the disclosure is not limited thereto or thereby.

The inkjet printer head 100 may be disposed above the probe device 7000 or the stage part STA. The inkjet printer head 100 may move after being mounted on the base frame 6000. The base frame 6000 may include a first supporter 610 and a second moving unit 630. The inkjet printer head 100 may be mounted on the second moving unit 630 disposed on the first supporter 610. The structure in which the inkjet printer head 100 is mounted on the second moving unit 630 should not be particularly limited. For example, the inkjet printer head 100 may be mounted directly on the second moving unit 630, or the inkjet printer head 100 may be mounted on or coupled with the second moving unit 630 using a separate coupling member.

The first supporter 610 may include a first horizontal support part 611 extending in the first direction DR1 that is a horizontal direction and a first vertical support part 612 connected to the first horizontal support part 611 and extending in the third direction DR3 that is a vertical direction. The extension direction of the first horizontal support part 611 may be the first direction DR1 perpendicular to the second direction DR2 that corresponds to the movement direction of the stage part STA on the first and second rails RL1 and RL2 in a plan view. The inkjet printer head 100 may be mounted on the second moving unit 630 disposed on the first horizontal support part 611. The second moving unit 630 may linearly move in a direction on the first horizontal support part 611. The second moving unit 630 may include a moving part 631 and a fixing part 632.

The moving part 631 of the second moving unit 630 may linearly move in the first direction DR1 on the first horizontal support part 611, and the inkjet printer head 100 may linearly move in the first direction DR1 with the second moving unit 630 while being fixed to the fixing part 632 of the second moving unit 630. Since the stage part STA may linearly move in the second direction DR2 by the first and second rails RL1 and RL2 and the inkjet printer head 100 may linearly move in the first direction DR1 by the second moving unit 630, the inkjet printer head 100 may spray the ink over an entire area of the target substrate SUB although the inkjet printer head 100 has a size smaller than a size of the target substrate SUB.

The stage part STA may move in a direction parallel to the second direction DR2 on the first and second rails RL1 and RL2, and the inkjet printer head 100 may move in a direction parallel to the first direction DR1, however, the disclosure should not be limited thereto or thereby. For example, the inkjet printer 1000 may further include a horizontal moving part that moves the inkjet printer head 100 in a direction parallel to the second direction DR2, and the first and second rails RL1 and RL2 that move the stage part STA in a direction parallel to the second direction DR2 may be omitted. For example, the stage part STA may be fixed and the inkjet printer head 100 may linearly move in the first direction DR1 and the second direction DR2 above the stage part STA to perform the printing process on the entire area of the target substrate SUB. For example, the relative position between the stage part STA and the inkjet printer head 100 may be adjusted by fixing the stage part STA and moving the inkjet printer head 100 in the horizontal direction, i.e., the first and second directions DR1 and DR2, or by fixing the inkjet printer head 100 and moving the stage part STA in the horizontal direction, i.e., the first and second directions DR1 and DR2.

For example, the stage part STA may linearly move in the second direction DR2 using the first moving unit including the first and second rails RL1 and RL2, and the inkjet printer head 100 may linearly move in the second direction DR2 using the second moving unit 630. However, the method of adjusting the relative position between the stage part STA and the inkjet printer head 100 should not be limited thereto or thereby.

The inkjet printer head 100 may be mounted on the second moving unit 630 disposed on the first supporter 610 and may be spaced apart from the stage part STA by a distance in the third direction DR3. A separation distance in the third direction DR3 between the inkjet printer head 100 and the stage part STA may be adjusted by a height of the first vertical support part 612 of the first supporter 610. The separation distance between the inkjet printer head 100 and the stage part STA may be adjusted within a range that secures enough space for the printing process by spacing the inkjet printer head 100 and the target substrate SUB apart by a certain distance in case that the target substrate SUB is disposed on the stage part STA.

Multiple head parts 300 may be disposed on a surface of the inkjet printer head 100, e.g., a lower surface of the inkjet printer head 100. The head parts 300 may be arranged spaced apart from each other. The head parts 300 may be arranged in a direction to be parallel to each other. The head parts 300 may be arranged in a row or multiple rows.

FIG. 1B illustrates that the head parts 300 are arranged in two rows, however, the disclosure should not be limited thereto or thereby. For example, the head parts 300 may be arranged in a row or three or more rows. The head parts 300 arranged in a row may be arranged to stagger the head parts 300 arranged in another row without overlapping the head parts 300 arranged in the another row. According to an embodiment, the number of the head parts 300 arranged in the inkjet printer head 100 may be in a range of about 128 to about 1800, however, the disclosure should not be limited thereto or thereby. The shape of the head part 300 should not be particularly limited, however, for example, the head part 300 may have a quadrangular shape in a plan view.

Figure 2:
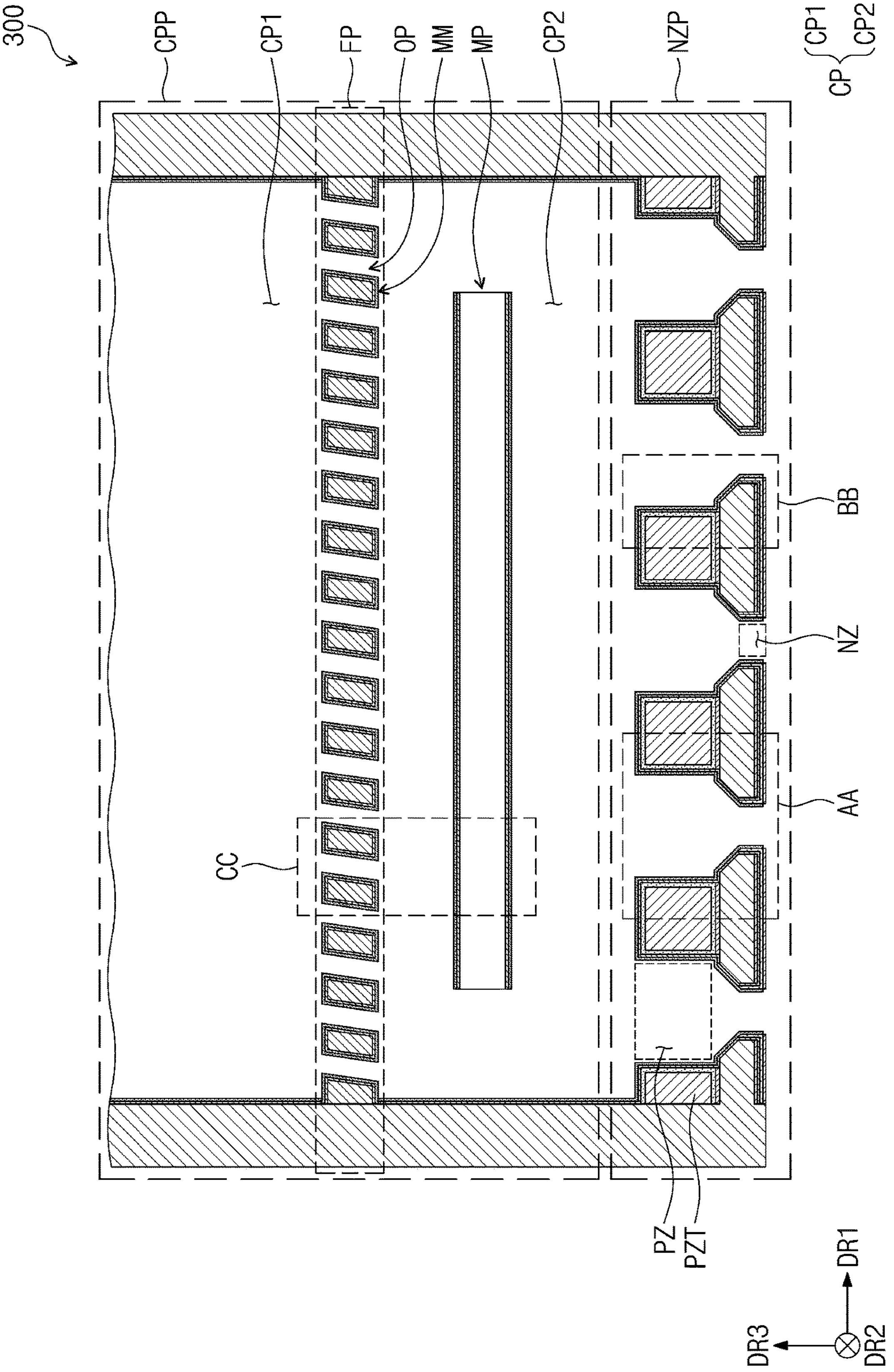
FIG. 2 is a schematic cross-sectional view of an inkjet printer head according to an embodiment of the disclosure.

FIG. 2 is a schematic cross-sectional view of the inkjet printer head 100 according to an embodiment of the disclosure.

Referring to FIG. 2, the head part 300 may include a chamber plate part CPP and a nozzle plate part NZP. The head part 300 may further include a filter part FP. The chamber plate part CPP may receive the ink from the fixing part 632 (refer to FIG. 1A) of the inkjet printer head 100 and may provide the ink to the nozzle plate part NZP, or the chamber plate part CPP may provide the ink, which is not ejected from the nozzle plate part NZP, back to the fixing part 632 (refer to FIG. 1A). For example, the chamber plate part CPP may be disposed between the nozzle plate part NZP and the fixing part 632 (refer to FIG. 1A), may provide a path through which the ink flows, and may provide an area in which a residual ink is circulated.

The chamber plate part CPP may include chamber parts CP1 and CP2 defined therein. The ink may be stored in the chamber parts CP1 and CP2. A first chamber part CP1 may be disposed between the nozzle plate part NZP and the fixing part 632 (refer to FIG. 1A). The first chamber part CP1 may receive the ink from an inner flow path, which may be located in the fixing part 632 (refer to FIG. 1A), and may supply the ink to the nozzle plate part NZP.

The ink supplied through the inner flow path, which may be located in the fixing part 632 (refer to FIG. 1A), may flow into the first chamber part CP1. A portion of the ink that flows into the first chamber part CP1 may be sprayed through the nozzle part NZ of the nozzle plate part NZP after passing through the filter part FP, and another portion of the ink that flows into the first chamber part CP1 may flow outward along the inner flow path, which may be located in the fixing part 632 (refer to FIG. 1A). For example, the first chamber part CP1 may provide the ink supplied thereto through the inner flow path, which may be located in the fixing part 632 (refer to FIG. 1A), to the nozzle plate part NZP or may return the ink, which is not ejected from the nozzle plate part NZP, to the inner flow path, which may be located in the fixing part 632 (refer to FIG. 1A).

A second chamber part CP2 may be disposed between the first chamber part CP1 and the nozzle plate part NZP. A portion of the ink provided through an opening OP of the filter part FP may be sprayed through the nozzle part NZ of the nozzle plate part NZP after passing through the second chamber part CP2. Another portion of the ink flowing along the second chamber part CP2 may move to the first chamber part CP1 via the opening OP defined through the filter part FP. For example, the second chamber part CP2 may provide the ink supplied thereto through the opening OP of the filter part FP to the nozzle plate part NZP or may return the ink, which is not ejected from the nozzle plate part NZP, to the inner flow path, which may be located in the fixing part 632.

The filter part FP may be disposed in the first and second chamber parts CP1 and CP2. The first chamber part CP1 and the second chamber part CP2 may be distinguished from each other by the filter part FP. The filter part FP may be provided with one or more openings OP. The filter part FP may include a metal mesh layer MM that consists of woven metal. The metal of the metal mesh layer MM may be a stainless-steel, however, the disclosure should not be limited thereto or thereby.

The filter part FP may be provided with one or more openings OP, may selectively pass specific particles in the ink, and may block other materials or a foreign substance in the ink except the specific particles. For example, the filter part FP may prevent other materials or the foreign substance except the specific particles from entering the nozzle plate part NZP in case that the ink flowing in the first chamber part CP1 flows into the nozzle part NZ of the nozzle plate part NZP. Accordingly, the nozzle part NZ may be prevented from being blocked by the foreign substance, or the ink ejected from the nozzle part NZ may be prevented from being mixed with the foreign substance.

The head part 300 may further include a metal plate MP disposed between the filter part FP and the nozzle plate part NZP. The metal plate MP may remove impurities in the ink flowing into the nozzle plate part NZP from the first chamber part CP1 or may guide the flow of the ink. The metal plate MP may cause the flow of the ink in a non-spray mode to prevent the precipitation of the particles dispersed in the ink remaining in the nozzle part NZ in the non-spray mode.

The nozzle plate part NZP may be disposed between the fixing part 632 and the target substrate SUB. The nozzle plate part NZP may be disposed between the chamber plate part CPP and the stage part STA. The ink may be sprayed from the nozzle plate part NZP of the head part 300. The nozzle plate part NZP may be provided with one or more nozzle parts NZ defined therein.

The nozzle plate part NZP may further include piezoelectric element parts PZT disposed adjacent to the nozzle part NZ. The piezoelectric element parts PZT may be arranged spaced apart from each other. The nozzle plate part NZP may include a piezoelectric element area PZ defined between the piezoelectric element parts PZT. The piezoelectric element area PZ may be disposed between the nozzle part NZ and the chamber parts CP1 and CP2.

The nozzle parts NZ may be arranged spaced apart from each other, and the nozzle parts NZ may spray the ink supplied thereto from the first chamber part CP1 and the second chamber part CP2. An ejection amount of the ink from each of the nozzle parts NZ may be adjusted by the piezoelectric element part PZT disposed in the nozzle plate part NZP. The piezoelectric element part PZT may control a pressure applied to the piezoelectric element area PZ in response to a voltage applied to the piezoelectric element part PZT. In case that the pressure is applied to the piezoelectric element area PZ, the ink in the piezoelectric element area PZ may be sprayed through the nozzle part NZ.

In the non-spray mode, the piezoelectric element part PZT of the nozzle plate part NZP may control the pressure of the piezoelectric element area PZ and the nozzle part NZ to be in equilibrium with a pressure outside of the piezoelectric element area PZ, and thus, the ink may not be ejected through the nozzle part NZ. In a spray mode, the piezoelectric element part PZT of the nozzle plate part NZP may control the pressure of the piezoelectric element area PZ and the nozzle part NZ to be greater than the pressure outside of the nozzle part NZ, and thus, the ink may be sprayed through the nozzle part NZ.

The piezoelectric element area PZ may be disposed between the chamber parts CP1 and CP2 and the target substrate SUB, and the ink may be temporarily stored in the chamber parts CP1 and CP2 before being sprayed to the target substrate SUB. The nozzle part NZ may be disposed between the piezoelectric element area PZ and the target substrate SUB. In case that the pressure is applied to the piezoelectric element area PZ by the piezoelectric element part PZT, the ink may be sprayed to the target substrate SUB from the piezoelectric element area PZ through the nozzle part NZ.

Figure 3:
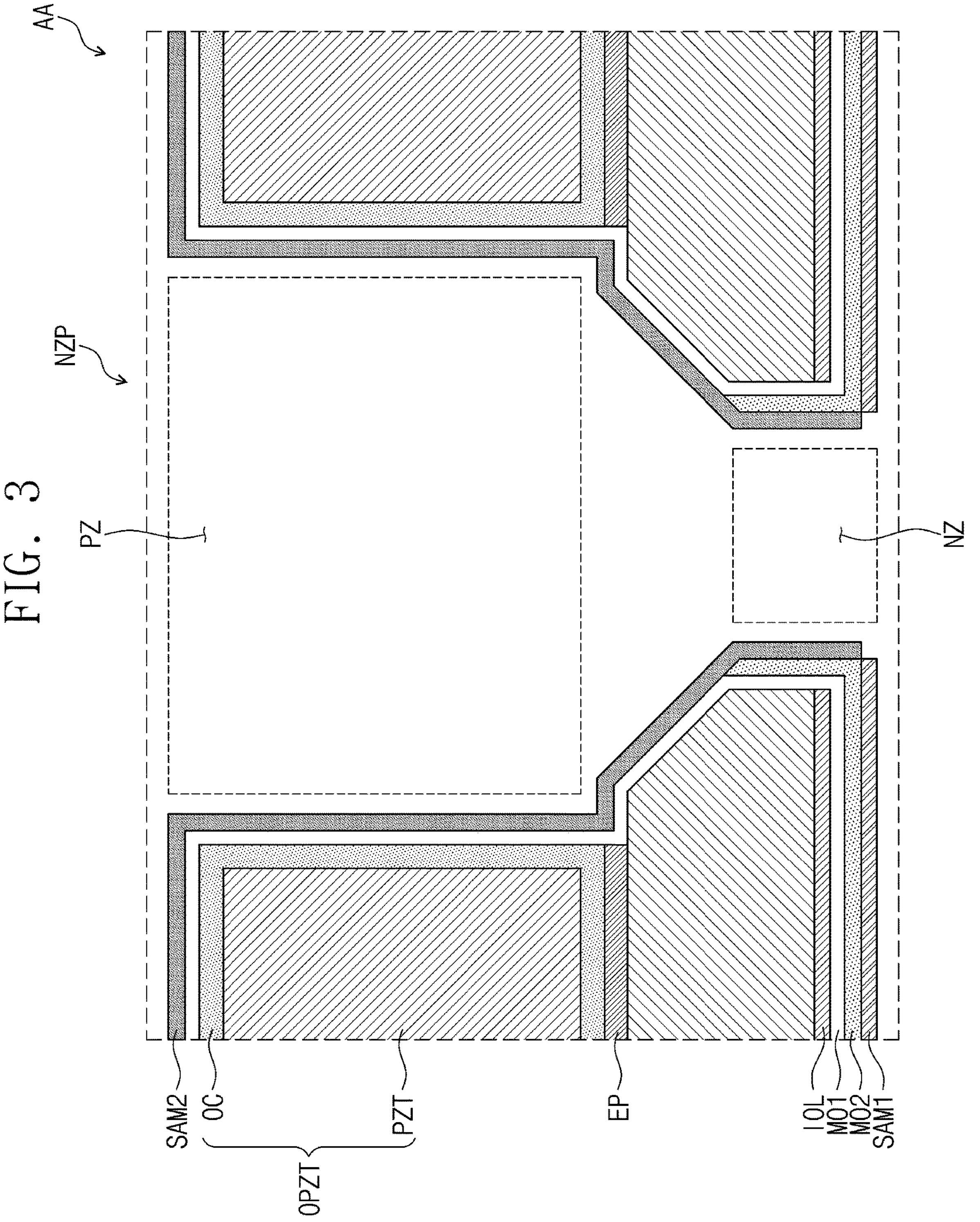
FIG. 3 is a schematic cross-sectional view of an inkjet printer head according to an embodiment of the disclosure.
Figure 4A:
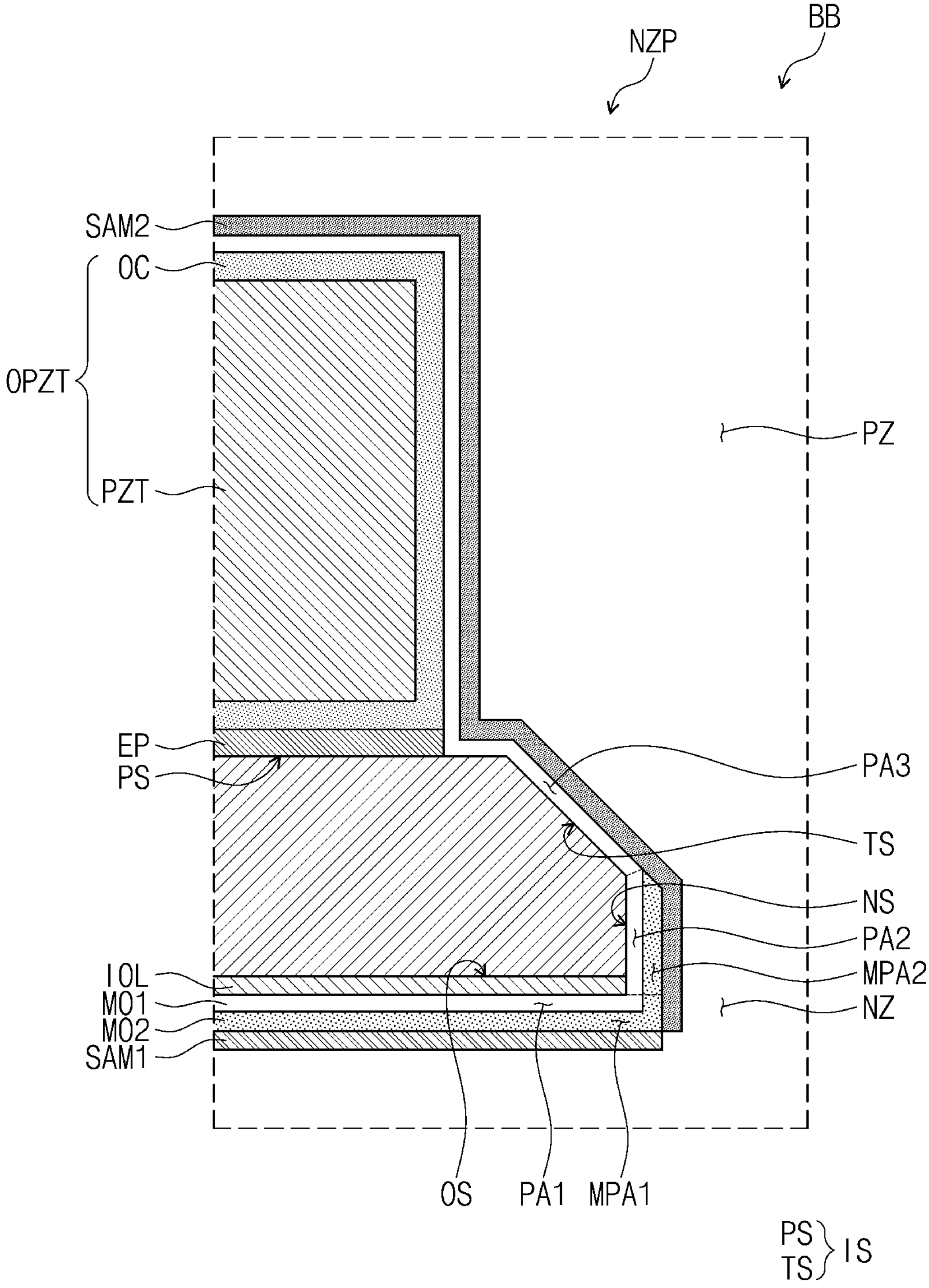
FIG. 4A is a schematic cross-sectional view of an inkjet printer head according to an embodiment of the disclosure.
Figure 4B:
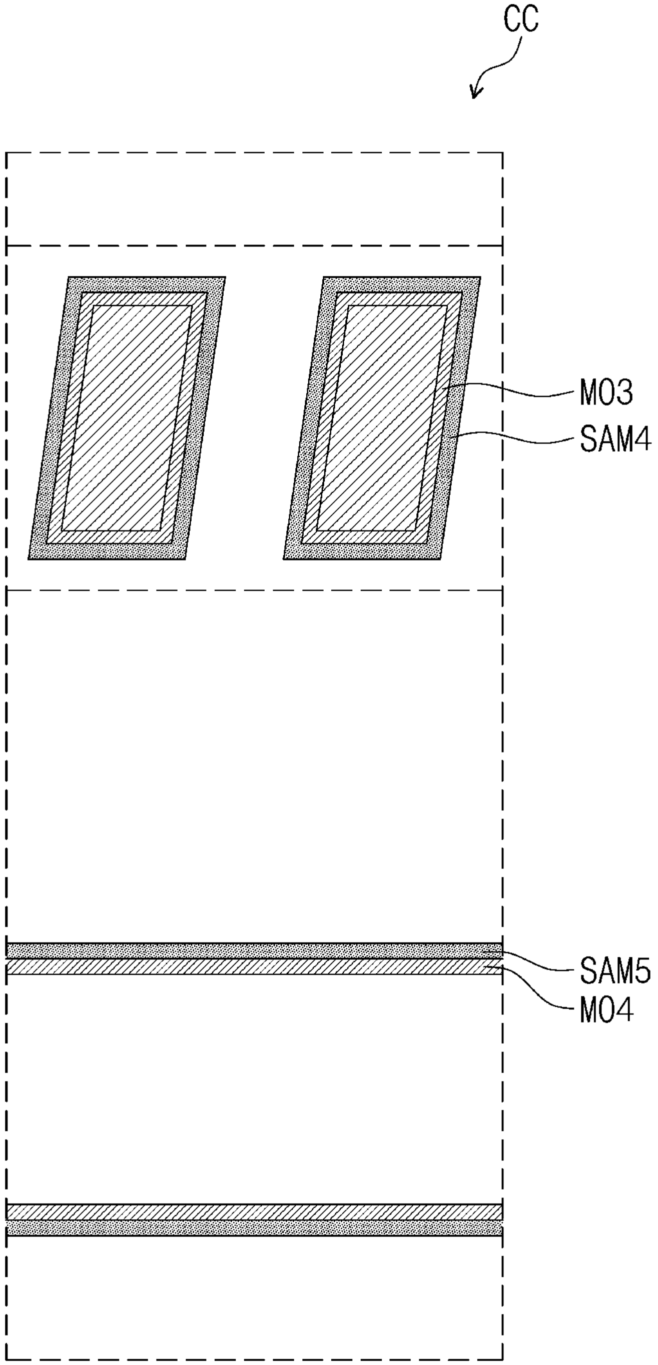
FIG. 4B is a schematic cross-sectional view of a filter part and a metal plate of an inkjet printer head according to an embodiment of the disclosure.
Figure 5:
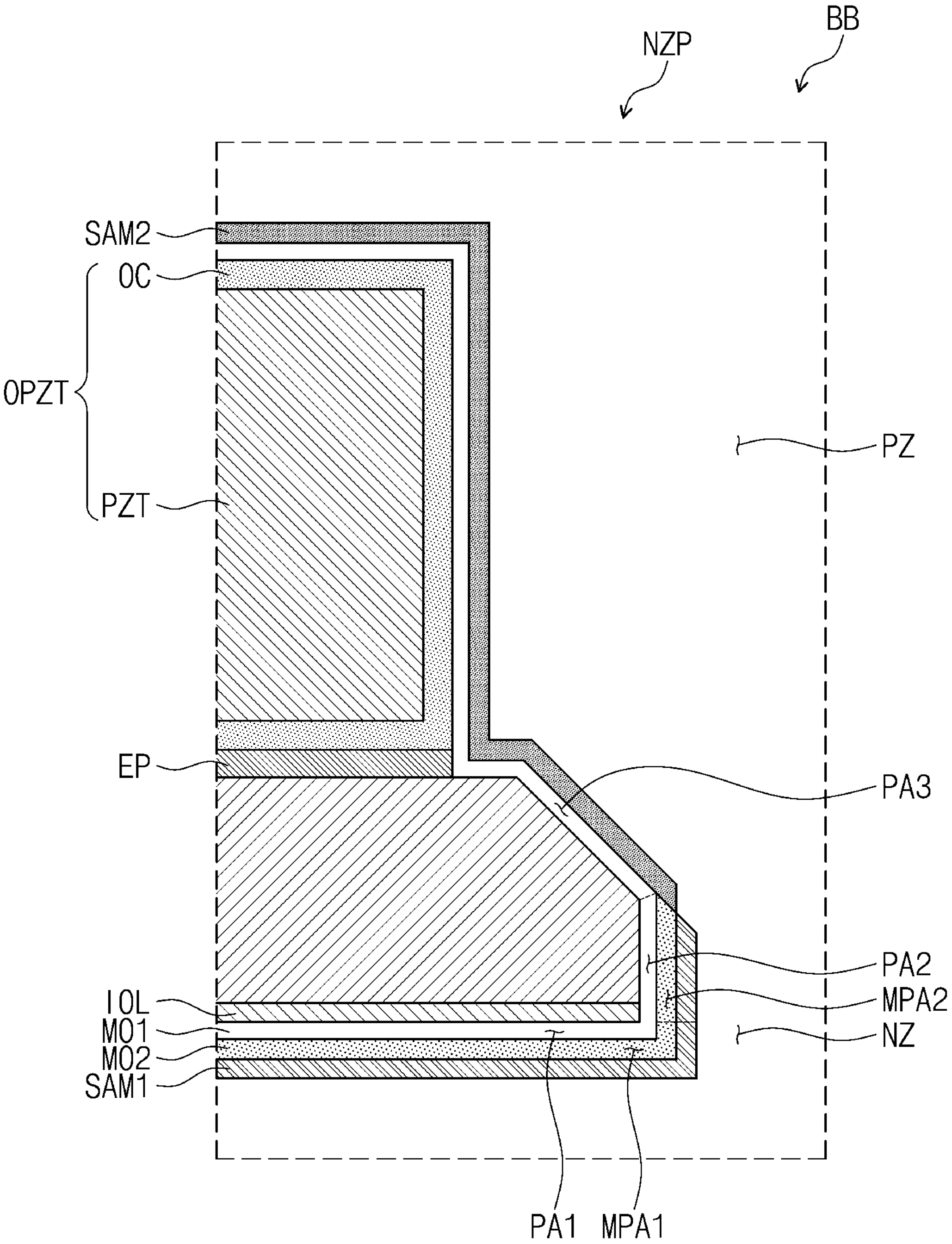
FIG. 5 is a schematic cross-sectional view of an inkjet printer head according to an embodiment of the disclosure.
Figure 6:
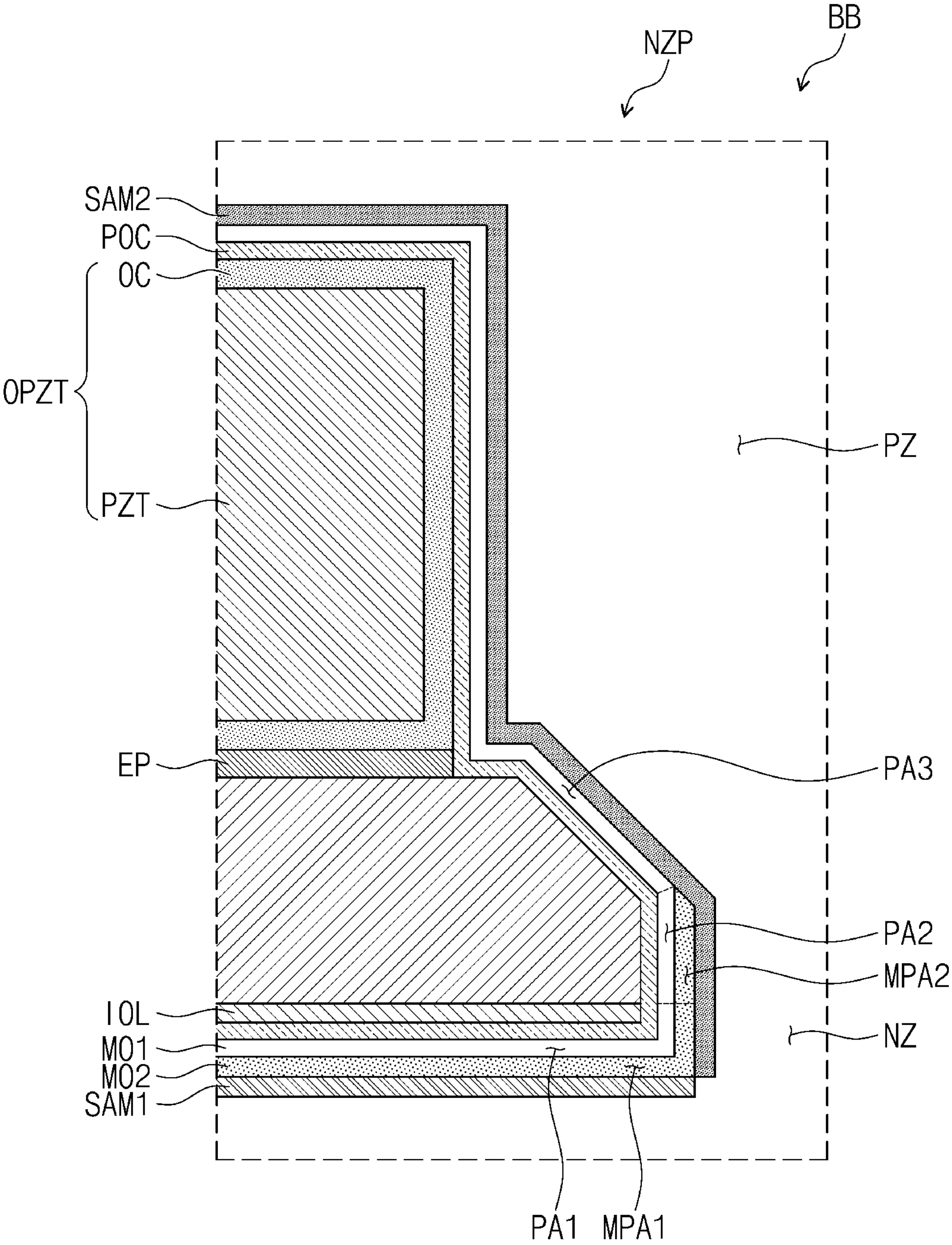
FIG. 6 is a schematic cross-sectional view of an inkjet printer head according to an embodiment of the disclosure.
Figure 7:
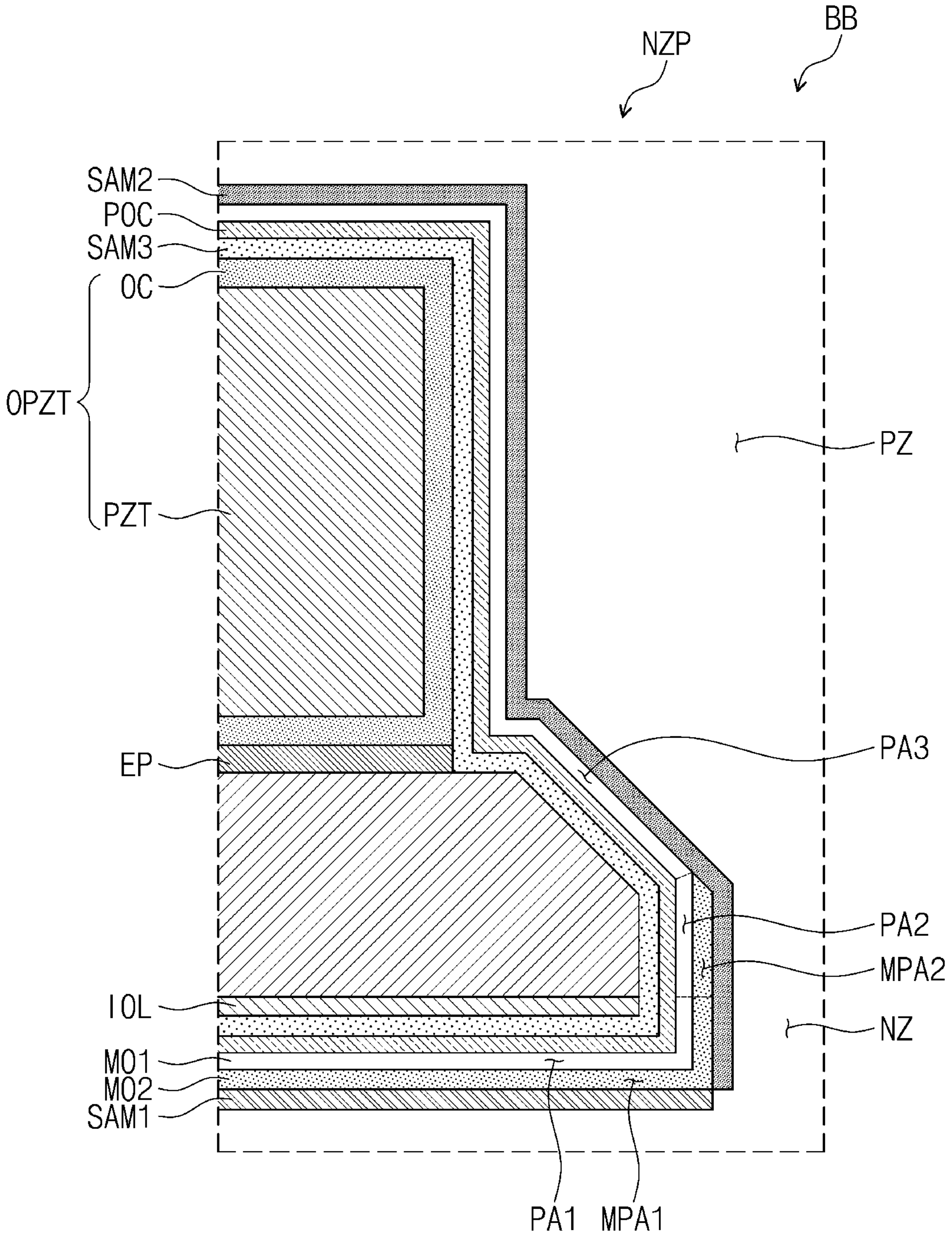
FIG. 7 is a schematic cross-sectional view of an inkjet printer head according to an embodiment of the disclosure.

FIG. 3 is a schematic cross-sectional view of an inkjet printer head according to an embodiment of the disclosure. FIG. 4A is a schematic cross-sectional view of an inkjet printer head according to an embodiment of the disclosure. FIG. 4B is a schematic cross-sectional view of a filter part and a metal plate of an inkjet printer head according to an embodiment of the disclosure. FIG. 5 is a schematic cross-sectional view of an inkjet printer head according to an embodiment of the disclosure. FIG. 6 is a schematic cross-sectional view of an inkjet printer head according to an embodiment of the disclosure. FIG. 7 is a schematic cross-sectional view of an inkjet printer head according to an embodiment of the disclosure. FIG. 3 shows a portion corresponding to area AA shown in FIG. 2. FIGS. 4A and 5 to 7 show a portion corresponding to area BB shown in FIG. 2. FIG. 4B shows a portion of the filter part FP and a portion of the metal plate MP shown in FIG. 2.

Referring to FIGS. 2, 3 and 4A, the head part 300 may include the nozzle plate part NZP and multiple layers disposed on the nozzle plate part NZP. For example, the head part 300 may include an inorganic layer IOL, a first metal oxide layer MO1, a second metal oxide layer MO2, a first self-assembled layer SAM1, and a second self-assembled layer SAM2, which are disposed on the nozzle plate part NZP. The nozzle plate part NZP may include the nozzle part NZ, an inner side surface IS including a flat surface PS disposed adjacent to the chamber part CP (refer to FIG. 2) and facing the outer side surface OS and an inclination surface TS disposed between the flat surface PS and the nozzle surface NS and inclined in a direction from the flat surface PS to the nozzle surface NS, an outer side surface OS facing the inner side surface IS, and a nozzle surface NS disposed adjacent to the nozzle part NZ and disposed between the outer side surface OS and the inner side surface IS. The outer side surface OS may be disposed adjacent to the stage part STA.

The nozzle part NZ may have a quadrangular shape or a circular shape in a cross-sectional view, however, the cross-sectional shape of the nozzle part NZ should not be limited thereto or thereby.

The inorganic layer IOL may be disposed on the outer side surface OS of the nozzle plate part NZP. The inorganic layer IOL may be a SiOC thin layer with a form in which carbon C is partially contained in silicon oxide ($SiO_X$), however, the disclosure should not be limited thereto or thereby. The inorganic layer IOL may mineralize the outer side surface OS of the head part 300. The inorganic layer IOL included in the head part 300 may be deposited in the form of a thin film by a physical vapor deposition (PVD) method or a sputter deposition method. For example, the inorganic layer IOL may have a thickness in a range of about 3 nm to about 50 nm. In an embodiment, the thickness of the inorganic layer IOL may be in a range of about 5 nm to about 30 nm. In an embodiment, the thickness of the inorganic layer IOL may be in a range of about 7 nm to about 20 nm.

The first metal oxide layer MO1 may be disposed on the inorganic layer IOL, the nozzle surface NS, and the inner side surface IS. The first metal oxide layer MO1 may include a first portion PA1 disposed on the inorganic layer IOL, a second portion PA2 disposed on the nozzle surface NS, and a third portion PA3 disposed on the inner side surface IS. The first metal oxide layer MO1 may include aluminum oxide. For example, the first metal oxide layer MO1 may include aluminum oxide having a chemical formula of $Al_xO_y$ (x and y are natural numbers). For example, the first metal oxide layer MO1 may include $Al_2O_3$.

The first metal oxide layer MO1 may impart a chemical resistance to a surface of the nozzle plate part NZP. The first metal oxide layer MO1 may perform a function of unifying the surface of the nozzle plate part NZP chemically and physically.

The first metal oxide layer MO1 may have a thickness in a range of about 5 nm to about 100 nm. In an embodiment, the thickness of the first metal oxide layer MO1 may be in a range of about 50 nm to about 80 nm, however, the disclosure should not be limited thereto or thereby.

The first metal oxide layer MO1 may be formed by depositing aluminum oxide in the form of a thin film by an atomic layer deposition (ALD) method, a physical vapor deposition (PVD) method, or a sputter deposition method.

The second metal oxide layer MO2 may be disposed on the first metal oxide layer MOL. The second metal oxide layer MO2 may include a first metal portion MPA1 disposed on the first portion PA1 and a second metal portion MPA2 disposed on the second portion PA2.

The second metal oxide layer MO2 may include silicon oxide having a chemical formula of $SiO_x$ (x is a natural number). For example, the second metal oxide layer MO2 may include $SiO_2$, however, the disclosure should not be limited thereto or thereby. The second metal oxide layer MO2 may impart a chemical resistance to the outer side surface OS and the nozzle surface NS of the nozzle plate part NZP. The second metal oxide layer MO2 may be deposited in the form of a thin layer by an atomic layer deposition (ALD) method, a physical vapor deposition (PVD) method, a chemical vapor deposition (CVD) method, or a sputter deposition method.

The second metal oxide layer MO2 may have a thickness in a range of about 5 nm to about 2000 nm. In an embodiment, the thickness of the second metal oxide layer MO2 may be in a range of about 10 nm to about 1500 nm, however, the disclosure should not be limited thereto or thereby.

The first self-assembled layer SAM1 may be disposed on the first metal portion MPA1. The first self-assembled layer SAM1 may be an outermost layer of the outer side surface OS of the nozzle plate part NZP. For example, the outer side surface OS of the nozzle plate part NZP may have a surface property determined by the first self-assembled layer SAM1. The first self-assembled layer SAM1 may include a first compound including a first hydrocarbon part, a first head part attached to an end of the first hydrocarbon part, and a first end part attached to another end of the first hydrocarbon part. The first head part may have a higher level of hydrophilicity compared with the first end part. The first end part may have a higher level of hydrophobicity compared with the first head part. The first head part may be disposed adjacent to the first metal oxide layer MO1, and the first end part may be disposed toward the outside. Accordingly, the outer side surface OS may have a relatively small contact angle.

The first head part of the first compound may include one of a compound represented by Moieties 1.

[Moieties 1]

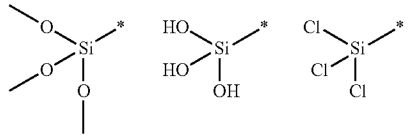

The first end part of the first compound may include one of a compound represented by Moieties 2.

[Moieties 2]

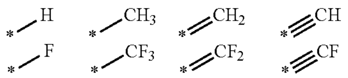

The first hydrocarbon part of the first compound may be an alkyl group of eight or more and sixty or less carbon atoms.

The surface of the first self-assembled layer SAM1 may have a first contact angle. The first contact angle of the first self-assembled layer SAM1 may be in a range of about 10° to about 200°. For example, the first self-assembled layer SAM1 may have an excellent liquid repellency, and the ink may be ejected from the nozzle part NZ without flowing to the outer side surface OS. Accordingly, the inkjet printer head 100 (refer to FIG. 1A) may provide an excellent ejection accuracy. The inkjet printer head 100 (refer to FIG. 1A) may reduce the ink adsorbed to the outer side surface OS, and thus, may have an excellent durability.

The first self-assembled layer SAM1 may have a thickness in a range of about 1 nm to about 40 nm. In an embodiment, the thickness of the first self-assembled layer SAM1 may be about 12 nm, however, the disclosure should not be limited thereto or thereby.

The first self-assembled layer SAM1 may be deposited in the form of a thin film by a physical vapor deposition (PVD) method, however, the disclosure should not be limited thereto or thereby.

The second self-assembled layer SAM2 may be disposed on the third portion PA3. The second self-assembled layer SAM2 may extend from an area adjacent to the third portion PA3 to the second metal portion MPA2. The second self-assembled layer SAM2 may cover the second metal portion MPA2. The second self-assembled layer SAM2 may be an outermost layer of the inner side surface IS of the nozzle plate part NZP. For example, the inner side surface IS of the nozzle plate part NZP may have a surface property determined by the second self-assembled layer SAM2.

The second self-assembled layer SAM2 may include a second compound including a second hydrocarbon part, a second head part connected to an end of the second hydrocarbon part, and a second end part connected to another end of the second hydrocarbon part. The second head part of the second compound may be disposed adjacent to the first metal oxide layer MO1. The second head part may have a higher level of hydrophilicity compared with the second end part. The second end part may have a higher level of hydrophobicity compared with the second head part. The second head part may be disposed adjacent to the first metal oxide layer MO1, and the second end part may be disposed toward the outside. Accordingly, the inner side surface IS may have a relatively small contact angle.

In case that the second self-assembled layer SAM2 extends to and is disposed on the second metal oxide layer MO2, the second head part of the second compound may be disposed adjacent to the second metal oxide layer MO2 on the second metal oxide layer MO2, and the second end part may be disposed toward the outside. Accordingly, the nozzle surface NS may have a relatively small contact angle.

The second head part of the second compound may include one of a compound represented by Moieties 1.

[Moieties 1]

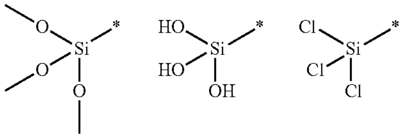

The second end part of the second compound may include one of a compound represented by Moieties 3.

[Moieties 3]

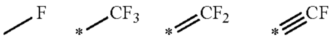

The second hydrocarbon part of the second compound may be an alkyl group of two or more and fifty or less carbon atoms.

The surface of the second self-assembled layer SAM2 may have a second contact angle. The second contact angle of the second self-assembled layer SAM2 may be in a range of about 100 to about 130°. For example, the second self-assembled layer SAM2 may have an excellent liquid repellency, and the ink may be ejected to the outside without being adsorbed. Accordingly, the inkjet printer head 100 (refer to FIG. 1A) may reduce an amount of the ink adsorbed to an inner side of the nozzle plate part NZP and may provide an excellent ejection accuracy and an excellent durability.

In case that the second self-assembled layer SAM2 extends to the nozzle surface NS, the nozzle surface NS may have an excellent liquid repellency, and the ink may be ejected to the outside without being adsorbed to the nozzle surface NS. Accordingly, the inkjet printer head 100 (refer to FIG. 1A) may provide an excellent ejection efficiency, an excellent ejection accuracy, and an excellent durability.

The second self-assembled layer SAM2 may have a thickness in a range of about 1 nm to about 30 nm. For example, the thickness of the second self-assembled layer SAM2 may be about 1.2 nm, however, the disclosure should not be limited thereto or thereby.

The second self-assembled layer SAM2 may be deposited in the form of a thin film by a chemical vapor deposition (CVD) method, however, the disclosure should not be limited thereto or thereby.

The contact angle of the first self-assembled layer SAM1 may be greater than the contact angle of the second self-assembled layer SAM2. For example, the contact angle of the first self-assembled layer SAM1 may be in a range of about 100 to about 200°, and the contact angle of the second self-assembled layer SAM2 may be in a range of about 10° to about 130°, however, the disclosure should not be limited thereto or thereby.

The number of carbon atoms included in the first hydrocarbon part of the first self-assembled layer SAM1 may be greater than the number of carbon atoms included in the second hydrocarbon part of the second self-assembled layer SAM2. As the number of carbon atoms of the hydrocarbon part increases, the hydrophobicity may increase, and the contact angle may increase. Accordingly, the first contact angle of the first self-assembled layer SAM1 may be greater than the second contact angle of the second self-assembled layer SAM2.

The second self-assembled layer SAM2 may be disposed at an outermost side of the inner side surface IS and the nozzle surface NS where a content of the ink and an ejection speed of the ink are required to be controlled, and thus, it is advantageous for the second self-assembled layer SAM2 have an appropriate contact angle.

The first self-assembled layer SAM1 may be disposed at an outermost side of the outer side surface OS where excellent liquid repellency is required without allowing the adsorption of the particles included in the ink, and thus, it is advantageous for the first self-assembled layer SAM1 to have a large contact angle so as to prevent the adsorption of the ink, which may block the ink ejection.

As the second self-assembled layer SAM2, which is disposed at the outermost side of the inner side surface IS and the nozzle surface NS, and the first self-assembled layer SAM1, which is disposed at the outermost side of the outer side surface OS, have different contact angles from each other, the ink may flow at an appropriate speed inside the head part 300, the particles included in the ink may not be adsorbed by the appropriate contact angle of the first self-assembled layer SAM1, the ink may not be adsorbed to an outer portion of the head part 300 by the second self-assembled layer SAM2 having a large contact angle in case that the ink is ejected to the outside, and the durability may be improved.

The first self-assembled layer SAM1 may have a surface energy in a range of about 14 mN/m to about 15 mN/m. For example, the first self-assembled layer SAM1 may have a surface energy of about 14.45 mN/m, however, the disclosure should not be limited thereto or thereby.

The first self-assembled layer SAM1 may have a coefficient of friction in a range of about 0.02 and to about 0.04. For example, the coefficient of friction of the first self-assembled layer SAM1 may be about 0.03, however the disclosure should not be limited thereto or thereby.

Referring to FIGS. 2 and 3, the first metal oxide layer MO1 may be disposed on an inner wall of the head part 300 except the metal mesh layer MM, the metal plate MP, and the nozzle plate part NZP. The second self-assembled layer SAM2 may be disposed on the first metal oxide layer MO1 disposed on the inner wall of the head part 300 except the metal mesh layer MM, the metal plate MP, and the nozzle plate NZP. The first metal oxide layer MO1 disposed on the inner wall of the head part 300 may have a single-layer structure. The first metal oxide layer MO1 disposed on the inner wall of the head part 300 and the first metal oxide layer MO1 disposed on the inorganic layer IOL, the nozzle surface NS, and the inner side surface IS may include a same material and formed through a same process. The second self-assembled layer SAM2 disposed on the first metal oxide layer MO1 disposed on the inner wall of the head part 300 may have a single-layer structure. The second self-assembled layer SAM2 disposed on the first metal oxide layer MO1 disposed on the inner wall of the head part 300 and the second self-assembled layer SAM2 disposed on the third portion PA3, the second metal portion MPA2, and a portion of the first metal portion MPA1 adjacent to the nozzle part NZ may include a same material and formed through a same process.

The head part 300 may further include an organic piezoelectric element part OPZT. The organic piezoelectric element part OPZT may include a piezoelectric element part PZT and an organic layer OC. In an embodiment, the organic layer OC may be omitted.

The piezoelectric element part PZT may be disposed on the third portion PA3. The organic layer OC may be disposed on and cover the piezoelectric element part PZT. The organic layer OC may planarize the inner flow path of the head part 300 to allow other materials to be readily deposited on the organic layer OC. An adhesive layer EP may be disposed between the organic layer OC and the flat surface PS. The adhesive layer EP may include an epoxy resin. In an embodiment, the adhesive layer EP may be omitted.

The organic layer OC may include parylene. For example, the organic layer OC may include parylene C type or parylene N Type, however, the disclosure should not be limited thereto or thereby.

The organic layer OC may have a thickness in a range of about 0.1 μm to about 5 μm. For example, the thickness of the organic layer OC may be about 2.5 μm, however, the disclosure should not be limited thereto or thereby.

The organic layer OC of the head part 300 may be deposited on the piezoelectric element part PZT in the form of a thin film by a chemical vapor deposition (CVD) method.

Referring to FIG. 4B, the head part 300 may include a third self-assembled layer SAM4 disposed on the metal mesh layer MM and a third metal oxide layer MO3 disposed between the metal mesh layer MM and the third self-assembled layer SAM4.

The head part 300 may further include a fourth self-assembled layer SAM5 disposed on the metal plate MP and a fourth metal oxide layer MO4 disposed between the metal plate MP and the fourth self-assembled layer SAM5.

The third self-assembled layer SAM4, the fourth self-assembled layer SAM5, and the second self-assembled layer SAM2 of the head part 300 may be formed through a same process and may include a same material.

The third metal oxide layer MO3, the fourth metal oxide layer MO4, and the first metal oxide layer MO1 of the head part 300 may be formed through a same process and may include a same material.

Hereinafter, a difference between nozzle plate parts shown in FIGS. 5 to 7 and the nozzle plate part shown in FIG. 4A will be described. Details on the same elements as those described with reference to FIGS. 1A to 4B will not be repeated, and descriptions will be focused on the difference between the nozzle plate parts shown in FIGS. 5 to 7 and the nozzle plate part shown in FIG. 4A.

Comparing the nozzle plate part NZP of FIG. 4A with the nozzle plate part NZP of FIG. 5, different from the structure shown in FIG. 4A where the second self-assembled layer SAM2 is disposed on and cover the second metal portion MPA2, FIG. 5 shows a structure in which a first self-assembled layer SAM1 is disposed on and cover a second metal portion MPA2.

Referring to FIG. 5, the first self-assembled layer SAM1 may be disposed at an outermost position of a nozzle surface NS. The nozzle surface NS may have a surface property determined by the first self-assembled layer SAM1. The first self-assembled layer SAM1 may have a relatively small contact angle, and thus, the nozzle surface NS may have excellent liquid repellency. Accordingly, the adsorption of the ink in the nozzle part NZ may be reduced, and thus, an inkjet printer head may have excellent ejection property.

Comparing the nozzle plate part NZP of FIG. 6 with the nozzle plate part NZP shown in FIG. 4A, different from the structure of the nozzle plate part NZP shown in FIG. 4A in which the first metal oxide layer MO1 is disposed directly on the organic layer OC, FIG. 6 shows a structure of the nozzle plate part NZP in which a piezoelectric organic layer POC is disposed between an organic layer OC and a first metal oxide layer MO1.

Referring to FIG. 6, the nozzle plate part NZP may further include the piezoelectric organic layer POC disposed between an inorganic layer IOL and a first portion PA1, between a nozzle surface NS and a second portion PA2, and between an inner side surface IS and a third portion PA3. The piezoelectric organic layer POC may be disposed directly on the organic layer OC of an organic piezoelectric element part OPZT.

The piezoelectric organic layer POC may cover and planarize the organic layer OC and a nozzle plate part NZP. Accordingly, as the nozzle plate part NZP includes the piezoelectric organic layer POC, other materials may be readily deposited on the piezoelectric organic layer POC.

The piezoelectric organic layer POC of the nozzle plate part NZP may include parylene C type or parylene N type.

The piezoelectric organic layer POC may have a thickness in a range of about 0.1 μm to about 51 μm. A sum of a thickness of the organic layer OC and a thickness of the piezoelectric organic layer POC may be greater than about 0.1 μm and may be equal to or smaller than about 5 μm.

The piezoelectric organic layer POC of the nozzle plate part NZP may be deposited on the organic layer OC of the piezoelectric element part PZT in the form of a thin film by a chemical vapor deposition (CVD) method.

Comparing the nozzle plate part NZP shown in FIG. 7 with the nozzle plate part NZP shown in FIG. 4A, different from the structure of the nozzle plate part NZP shown in FIG. 4A in which the first metal oxide layer MO1 covers the organic layer OC, FIG. 7 shows a structure of the nozzle plate part NZP in which an organic layer OC is covered not by a first metal oxide layer MO1 but by a piezoelectric organic layer POC and the piezoelectric organic layer POC is disposed between the organic layer OC and the first metal oxide layer MO1. An adhesive auxiliary layer SAM3 may cover the piezoelectric organic layer POC and may be disposed between the piezoelectric organic layer POC and the first metal oxide layer MO1.

The adhesive auxiliary layer SAM3 of the nozzle plate part NZP may be non-specifically bonded to parylene and may be bonded well to the organic layer OC and the piezoelectric organic layer POC, and thus the adhesive auxiliary layer SAM3 may perform a function of combining the organic layer OC and the piezoelectric organic layer POC.

Referring to FIG. 7, in case that the piezoelectric organic layer POC is disposed between the adhesive auxiliary layer SAM3 and the first metal oxide layer MO1 and covers the adhesive auxiliary layer SAM3, the piezoelectric organic layer POC may planarize an upper portion of the organic layer OC to allow other materials to be readily deposited on the piezoelectric organic layer POC. The adhesive auxiliary layer SAM3 may be non-specifically bonded to parylene and may be bonded well to the organic layer OC and the piezoelectric organic layer POC. Accordingly, the adhesive auxiliary layer SAM3 may perform the function of combining the organic layer OC and the piezoelectric organic layer POC, and the bond between the organic layer OC and the piezoelectric organic layer POC may become stronger.

The adhesive auxiliary layer SAM3 of the nozzle plate part NZP may include Silane A 174 (Methacryloxypropyl trimethoxysilane).

The adhesive auxiliary layer SAM3 may have a thickness in a range of about 1 nm to about 20 nm. In an embodiment, the thickness of the adhesive auxiliary layer SAM3 may be in a range of about 1 nm to about 10 nm, however, the disclosure should not be limited thereto or thereby.

The adhesive auxiliary layer SAM3 may be deposited on the organic layer OC of a piezoelectric element part PZT in the form of a thin film by a chemical vapor deposition (CVD) method or a physical vapor deposition (PVD) method.

Hereinafter, the inkjet printer head and the inkjet printer according to the disclosure will be described in detail with reference to embodiment examples and comparative examples. Embodiment examples shown below are provided solely for the purpose of better understanding the disclosure, and the scope of the disclosure should not be limited thereto or thereby.

Analysis of Expected Probability of Adsorption

Table 1 shows results of analyzing the expected probability of adsorption onto polyimide (PI), the first self-assembled layer SAM1, and the second self-assembled layer SAM2.

The expected probability of adsorption onto polyimide is measured using an inkjet printer head manufactured by Konica Minolta. The expected probability of adsorption onto properties of polyimide, the first self-assembled layer SAM1, and the second self-assembled layer SAM2 are analyzed. The first self-assembled layer may include the first compound described above, and the second self-assembled layer may include the second compound described above.

Table 1 below shows the expected probability of adsorption onto polyimide (PI), the first self-assembled layer SAM1, and the second self-assembled layer SM2 by comparing coefficient of frictions (CoF) and their relative ratio, surface energies and their relative ratio, and strengths and by taking into account a situation in which the material expected to be adsorbed is diffused. In case that the coefficient of friction is large and the surface energy is small, the liquid repellency on the surface is excellent, and thus the probability of particle adsorption is reduced. In the evaluation, seeding, clustering weighted analysis value, and flow analysis value (ink solvent polarity, flow, etc.) are not applied.

In Table 1 below, the adsorption probability of each of silver (Ag) particle and aluminum (Al) particle onto polyimide, the first self-assembled layer SAM1, and the second self-assembled layer SAM2 is expressed as percent (%) considering both of a binding energy and a diffusion. In case that the adsorption probability (%) is small, the less adsorption of the particles occurs, and the nozzle of the inkjet printer may eject the ink smoothly and continuously.

TABLE 1

| | adsorption probability (%) | | | | |
|---|---|---|---|---|---|
| | | SAM2 | | SAM1 | |
| Type | PI (oxygen) | Binding Energy (eV) | +diffusion (%) | Binding Energy (eV) | +diffusion (%) |
| Ag | 137.85 | 122.00 | 99.49 | 29.22 | 5.67 |
| Al | 100.00 | 88.50 | 72.18 | 21.20 | 4.11 |

Referring to Table 1, in case that the diffusion of particles is considered, the second self-assembled layer SAM2 shows the adsorption probability with respect to aluminum (Al) particle of about 72.18%, and the first self-assembled layer SAM1 shows the adsorption probability with respect to aluminum (Al) particle of about 4.11% compared with PI (oxygen). From this, it is observed that the first self-assembled layer SAM1 has a small adsorption probability with respect to silver (Ag) particle and aluminum (Al) particle compared with polyimide. Accordingly, in case that the inkjet printer head includes the second self-assembled layer SAM2 disposed on the inner side surface of the head part and the first self-assembled layer SAM1 disposed on the outer side surface of the head part, the amount of ink accumulated in a chamber may be reduced, so that the ink may be continuously and smoothly ejected.

Analysis of Abrasion Resistance

Table 2 and Table 3 show an analysis of physical and chemical abrasion resistance of the first self-assembled layer SAM1 according to the disclosure. The contact angle is obtained by measuring an angle formed by a tangent line between a solid surface (the first self-assembled layer SAM1 as an adsorbate) and a liquid surface (DI-WATER as an adsorbent) at a contact line between the adsorbate and the adsorbent using the DI-WATER.

Table 2 below shows a contact angle measured before and after wiping the first self-assembled layer SAM1 2000 times with an eraser weighing 1 kg to analyze a physical reliability of the first self-assembled layer SAM1 according to the disclosure. In case that a change in the contact angle after wiping is small compared with an initial contact angle, it means that the physical abrasion resistance is high.

TABLE 2

| | initial contact angle | contact angle after wiping |
|---|---|---|
| SAM1 | 116.3° | 116.0° |

Referring to Table 2, the first self-assembled layer SAM1 of the disclosure has a small change in the contact angle even though the physical wiping is performed. Accordingly, the inkjet printer head including the first self-assembled layer SAM1 disposed on the outer side surface may maintain excellent liquid repellency and thus may have excellent durability. Table 3 below shows results of analyzing a chemical reliability of the first self-assembled layer SAM1 according to the disclosure. The first self-assembled layer SAM1 before being immersed is compared with the first self-assembled layer SAM1 after being immersed in a liquid acrylate monomer for 8 days and wiped using ethanol to analyze whether there is a change in contact angle, a scratch occurs, and a film detachment occurs.

In case that the change in contact angle is small after the immersion and the surface of the first self-assembled layer SAM1 does not have scratches or does not have debris, which remain after the surface is delaminated, even though the physical wiping is performed to the first self-assembled layer SAM1 after the immersion, the chemical reliability of the first self-assembled layer SAM1 may be evaluated as excellent.

TABLE 3

| | contact angle D.I | contact angle acrylate monomer | Whether scratch exists | Whether surface is delaminated |
|---|---|---|---|---|
| Before immersion | 116.5° | 78.8° | X | X |
| After immersion (immersion in acrylate monomer for 8 days + surface wiping) | 116.5° | 77.5° | X | X |

Referring to Table 3, a significant change in contact angle does not occur in the first self-assembled layer SAM1 of the disclosure after being immersed in acrylate monomer for 8 days, compared with the contact angle before the immersion. Even though the surface is wiped with ethanol after the immersion, no scratch or delamination is observed on the surface of the first self-assembled layer SAM1, and thus, the first self-assembled layer SAM1 maintains the excellent liquid repellency despite being immersed. Accordingly, it is observed that the first self-assembled layer SAM1 according to the disclosure has the chemical film reliability.

Analysis of Impact Accuracy of Ejected Ink Droplets

Table 4 shows results of comparison analysis of the impact accuracy of ejected ink droplets between comparative example 1 and embodiment example 1.

Table 4 below shows comparative example 1 and embodiment example 1. Comparative example 1 has a structure in which SiOC (about 15 nm) is deposited on the outer side surface OS of the inkjet printer head, PFA (about 5 nm) is deposited on SiOC, and SiOC is not deposited on the inner side surface IS and the nozzle surface NS, and embodiment example 1 has a structure in which SiOC (about 15 nm) is deposited on the outer side surface OS of the inkjet printer head, Al2O3 (about 10 nm) is deposited on SiOC, the first self-assembled layer SAM1 (about 12 nm) is deposited on Al2O3, Al2O3 (about 10 nm) is deposited on the inner side surface IS and the nozzle surface NS, and the second self-assembled layer SAM2 (about 1.1 nm) is deposited on Al2O3. In comparative example 1 and embodiment example 1, a distance from a substrate is about 1 mm, the ink is ejected at a speed of about 353 mm/s (about 5 kHz), an experimental temperature is about 35° C., and an optimal waveform is applied. X and Y respectively represent vertical and horizontal axes of the substrate, which is a surface corresponding to an impact area. σ represents a radius of the impact area of ink droplets, ξ and represents a ratio of the ink droplets hit within the radius of the impact area. As the radius of the impact area decreases and the ratio of the ink droplets hit within the radius of the impact area increases, the impact accuracy becomes excellent.

TABLE 4

| | Comparative example 1 | | Embodiment example 1 | |
|---|---|---|---|---|
| — | X | Y | X | Y |
| σ | 9.91 μm | 9.03 μm | 7.48 μm | 7.02 μm |
| ξ | 93.4% | 96.9% | 96.5% | 96.5% |

Referring to Table 4, compared with comparative example 1, the impact area of the ejected ink droplets of embodiment example 1 is narrow, indicating that embodiment example 1 has an excellent performance in relation to ejection and impact. Embodiment example 1 shows a uniform ratio of impact in both vertical and horizontal directions, demonstrating a superior accuracy in relation to ejection and impact compared with comparative example 1. According to the disclosure, as the inkjet printer head includes at least one head part and at least one head part includes layers having different physical and chemical properties from each other on the inner side surface, the nozzle surface, and the outer side surface, the inkjet printer head may have excellent ink ejection property and excellent abrasion resistance.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. An inkjet printer comprising:

a stage part; and an inkjet printer head disposed on the stage part and comprising a plurality of head parts, each of the plurality of head parts comprising:

a chamber plate part comprising a chamber part;

a nozzle plate part disposed between the chamber plate part and the stage part and comprising a nozzle part connected to the chamber part, an outer side surface adjacent to the stage part, an inner side surface adjacent to the chamber part, and a nozzle surface disposed between the outer side surface and the inner side surface and adjacent to the nozzle part;

an inorganic layer disposed on the outer side surface;

a first metal oxide layer comprising a first portion disposed on the inorganic layer, a second portion disposed on the nozzle surface, and a third portion disposed on the inner side surface;

a second metal oxide layer comprising a first metal portion disposed on the first portion and a second metal portion disposed on the second portion;

a first self-assembled layer disposed on the first metal portion and having a first contact angle; and a second self-assembled layer disposed on the third portion and having a second contact angle smaller than the first contact angle.

2. The inkjet printer of claim 1, wherein the second self-assembled layer is disposed on and cover the second metal portion.

3. The inkjet printer of claim 1, wherein the first self-assembled layer is disposed on and cover the second metal portion.

4. The inkjet printer of claim 1, wherein the inner side surface comprises:

a flat surface disposed adjacent to the chamber part and facing the outer side surface; and an inclination surface disposed between the flat surface and the nozzle surface and inclined in a direction from the flat surface to the nozzle surface.

5. The inkjet printer of claim 1, wherein the chamber plate part further comprises:

a filter part disposed in the chamber part and comprising a plurality of openings;

a metal plate disposed between the filter part and the nozzle plate part;

a third self-assembled layer disposed to cover the filter part and having a third contact angle smaller than the first contact angle;

a third metal oxide layer disposed between the third self-assembled layer and the filter part;

a fourth self-assembled layer disposed to cover the metal plate and having a fourth contact angle smaller than the first contact angle; and a fourth metal oxide layer disposed between the fourth self-assembled layer and the metal plate.

6. The inkjet printer of claim 5, wherein each of the filter part and the metal plate comprises a stainless-steel.

7. The inkjet printer of claim 1, wherein the nozzle plate part further comprises a piezoelectric element part disposed between the third portion and the inner side surface.

8. The inkjet printer of claim 1, further comprising:

an organic layer disposed between the inorganic layer and the first portion, between the nozzle surface and the second portion, and between the inner side surface and the third portion, wherein the organic layer has a single-layer structure.

9. The inkjet printer of claim 8, further comprising:

an adhesive auxiliary layer disposed between the organic layer and the first metal oxide layer.

10. The inkjet printer of claim 1, wherein the first self-assembled layer comprises a first compound comprising a first hydrocarbon part, a first head part attached to an end of the first hydrocarbon part, and a first end part attached to another end of the first hydrocarbon part, the second self-assembled layer comprises a second compound comprising a second hydrocarbon part, a second head part connected to an end of the second hydrocarbon part, and a second end part connected to another end of the second hydrocarbon part, the first head part is disposed adjacent to the first metal oxide layer, and the second head part is disposed adjacent to the second metal oxide layer.

11. The inkjet printer of claim 10, wherein the first head part includes one of a compound represented by Moieties 1:

[Moieties 1]

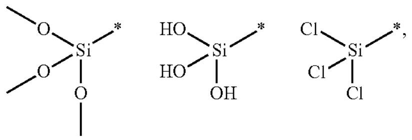

the first end part includes one of a compound represented by Moieties 2:

[Moieties 2]

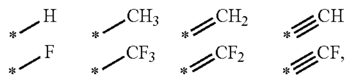

and the first hydrocarbon part is an alkyl group of eight or more and sixty or less carbon atoms.

12. The inkjet printer of claim 10, wherein the second head part includes one of a compound represented by Moieties 1:

[Moieties 1]

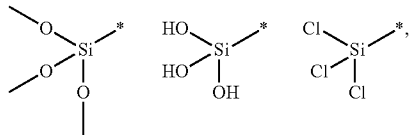

the second end part includes one of a compound represented by Moieties 2:

[Moieties 2]

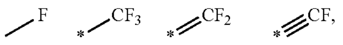

and the second hydrocarbon part is an alkyl group of two or more and fifty or less carbon atoms.

13. The inkjet printer of claim 1, wherein the first contact angle is in a range of about 100 to about 200°, and the second contact angle is in a range of about 10° to about 130°.

14. An inkjet printer head comprising:

at least one head part, the at least one head part comprising:

a chamber plate part comprising a chamber part;

a nozzle plate part comprising a nozzle part connected to the chamber part, an inner side surface adjacent to the chamber part, an outer side surface facing the inner side surface, and a nozzle surface disposed adjacent to the nozzle part and disposed between the outer side surface and the inner side surface;

an inorganic layer disposed on the outer side surface;

a first metal oxide layer comprising a first portion disposed on the inorganic layer, a second portion disposed on the nozzle surface, and a third portion disposed on the inner side surface;

a second metal oxide layer comprising a first metal portion disposed on the first portion and a second metal portion disposed on the second portion;

a first self-assembled layer disposed on the first metal portion and having a first contact angle; and a second self-assembled layer disposed on the third portion and having a second contact angle smaller than the first contact angle, wherein the second metal portion is covered by the first self-assembled layer or the second self-assembled layer.

15. The inkjet printer head of claim 14, wherein the inner side surface comprises:

a flat surface disposed adjacent to the chamber part and facing the outer side surface; and an inclination surface disposed between the inner side surface and the outer side surface and inclined in a direction from the inner side surface to the outer side surface.

16. The inkjet printer head of claim 14, wherein the first self-assembled layer comprises a first compound comprising a first hydrocarbon part, a first head part attached to an end of the first hydrocarbon part, and a first end part attached to another end of the first hydrocarbon part, the second self-assembled layer comprises a second compound comprising a second hydrocarbon part, a second head part connected to an end of the second hydrocarbon part, and a second end part connected to another end of the second hydrocarbon part, the first head part is disposed adjacent to the first metal oxide layer, and the second head part is disposed adjacent to the second metal oxide layer.

17. The inkjet printer head of claim 16, wherein each of the first and second head parts includes one of a compound represented by Moieties 1:

[Moieties 1]

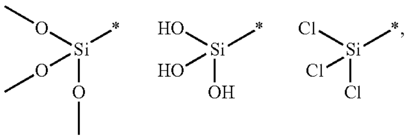

the first end part includes one of a compound represented be Moieties 2:

[Moieties 2]

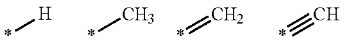

-continued

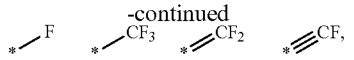

the second end part includes one of a compound represented by Moieties 3:

[Moieties 2]

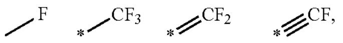

the first hydrocarbon part is an alkyl group of eight or more and sixty or less carbon atoms, and the second hydrocarbon part is an alkyl group of two or more and fifty or less carbon atoms.

18. The inkjet printer head of claim 14, wherein the first contact angle is in a range of about 10° and to about 200°, and the second contact angle is in a range of about 100 to about 130°.

19. The inkjet printer head of claim 14, wherein the nozzle plate part further comprises:

an organic piezoelectric element part comprising a piezoelectric element part disposed between the inner side surface and the third portion and an organic layer disposed between the piezoelectric element part and the first metal oxide layer and covering the piezoelectric element part; and a piezoelectric organic layer disposed between the inorganic layer and the first portion, between the nozzle surface and the second portion, and between the inner side surface and the third portion and cover the organic piezoelectric element part, and the piezoelectric organic layer is disposed directly on the organic layer.

20. The inkjet printer head of claim 19, further comprising:

an adhesive auxiliary layer disposed between the organic layer and the piezoelectric organic layer.

* * * * *